Sept. 18, 1962 C. F. MASON 3,054,985

MATRIX LINE SELECTOR

Filed June 12, 1959

Inventor:
Charles F. Mason,
by Lust & Frish
Attorneys.

United States Patent Office 3,054,985

Patented Sept. 18, 1962

3,054,985

MATRIX LINE SELECTOR

Charles F. Mason, Fort Wayne, Ind., assignor to International Telephone and Telegraph Corporation Filed June 12, 1959, Ser. No. 820,049
9 Claims. (Cl. 340—166)

This invention relates generally to matrices, such as diode matrices, employed for selectively connecting predetermined inputs to a common output, and more particularly to a line selecting system for such a matrix.

In a conventional matrix arrangement, a plurality of input or "Y" lines and a plurality of output or "X" lines are provided, with information sources, typically in the form of sources of potential, being connected to the input lines. The output lines are coupled to a common output circuit and each individual output line derives the information from the input lines by interconnecting diodes between the output line and one or more preselected input lines; the desired output is then obtained by applying the proper potential on the particular output line which has diodes connected to the proper input lines.

In a typical application for such a diode matrix, the input lines of the matrix are connected to the outputs of a pulse counting chain formed of a series of bistable multivibrators with the input to the first multivibrator being a standard frequency signal. In such an application, the input lines are connected to the output lines by diodes in such a way that the proper multivibrator outputs are connected to the various matrix output lines so that each matrix output line has an output signal at some definite predetermined time; an output signal can thus be obtained at the common output of the matrix output lines at any predetermined time by selecting the proper output line. In prior diode matrix systems known to the present applicant, selection of the desired output line has been accomplished by the use of relays. The employment of relays to perform such a matrix output line selection requires considerable power for relay operation, and in addition, relays are inherently expensive, involve an inherent time delay in operation, and since they contain moving parts, are subject to wear. Furthermore, relays inherently present a relatively low input impedance, thus preventing their being directly energized by solid state programming devices. It is therefore desirable to provide a matrix system in which any desired output line of the matrix can be selected by the mere application of an input signal and without requiring the use of relays or other mechanical switches.

My invention in its broader aspects, therefore, provides a matrix comprising a plurality of input lines for connection respectively to potential sources having upper and lower potential states, such as the outputs of a bistable multivibrator pulse counting chain, and a plurality of output lines each connected to an output circuit, with a plurality of static switching devices, such as diodes, respectively interconnecting predetermined ones of the input and output lines, each of the devices being polarized to connect its respective input and output lines when the potential source of its input line is in one of its potential states and to disconnect the lines when the source is in its opposite potential state. A plurality of output line selector circuits are provided respectively providing one potential state responsive to an input signal and another potential state in the absence of an input signal, the selector circuits being respectively connected to the matrix output lines by second static switching devices, again such as diodes, with each of the second devices being polarized to connect its respective output line to a source of potential when its selector circuit provides one of its potential states, and to disconnect the same when its selector circuit provides the other of its potential states. Means are provided for selecting one of the matrix output lines comprising means for selectively impressing an input signal on one of the selector circuits so that the output circuit of the one matrix output line thereby selected provides an output signal responsive to all of the potential sources which are connected to the switching devices connected to the one selected matrix output line being in the same potential state. Another output circuit is provided coupled to the output circuits of the matrix output lines for providing an output signal responsive to an output signal being provided in any one of the matrix output line output circuits. In the preferred embodiment of my invention, the matrix output line selector circuits each include a transistor with an output circuit coupled to one of its collector and emitter elements for providing a lower potential state responsive to impression of an input signal on its base and an upper potential state in the absence of an input signal, and with the selector circuit output circuits being respectively connected to the matrix output lines by diodes, these diodes being polarized to conduct when the respective selector circuit output circuits provide their upper potential state, and to be blocked when they provide their lower potential state. The preferred embodiment of my invention further provides a diode OR circuit coupled between the common output of the matrix and the matrix output line output circuits.

It is therefore an object of my invention to provide a matrix system incorporating improved output line selecting means.

Another object of my invention is to provide a matrix system incorporating static output line selecting means.

A further object of my invention is to provide a system for selectively energizing one output line of a matrix without requiring the use of relays or mechanical switches.

Still another object of my invention is to provide a matrix line selecting system employing transistors as line selectors.

The above mentioned and other features and objects of this invention and the manner of attaining them will become more apparent and the invention itself will be best understood by reference to the following description of an embodiment of the invention taken in conjunction with the accompanying drawings, wherein.

Figure 1:
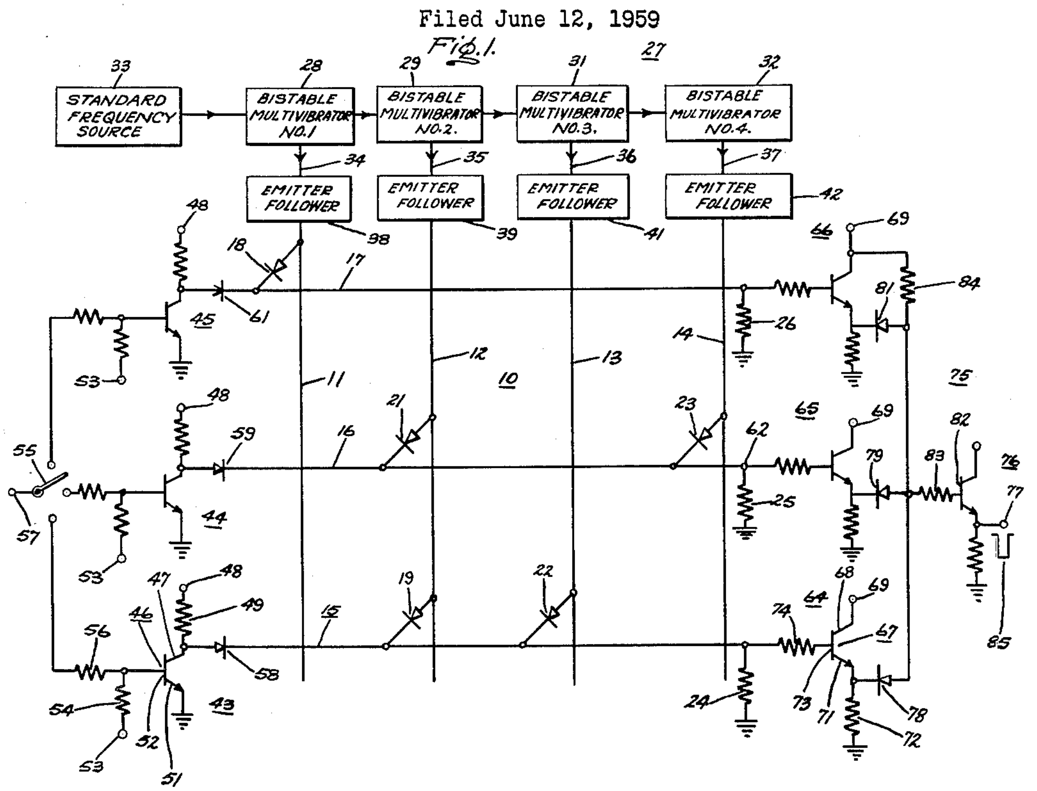
FIG. 1 is a diagram schematically illustrating the system of my invention.

Referring now to the figures of the drawing, there is shown a diode matrix, generally indicated at 10, comprising a plurality of input or "Y" lines, four of which are here shown at 11, 12, 13 and 14, and a plurality of output or "X" lines, three of which are here shown at 15, 16 and 17. As will be hereinafter more fully described, certain preselected ones of the input and output matrix lines are interconnected by diodes and thus, in the illustrated embodiment, input line 11 and output line 17 are connected by diode 18, input line 12 and output lines 15 and 16 are connected by diodes 19 and 21, input line 13 and output line 15 are connected by diode 22, and input line 14 and output line 16 are connected by diode 23. Output lines 15, 16 and 17 are respectively provided with output circuits 24, 25 and 26 comprising resistors respectively connected to ground as shown. It will now be readily seen that the diodes 18, 19 and 21 through 23 are each polarized so as to conduct when a positive source of potential is applied to the respective input line, and to be blocked when a potential at or below ground is impressed on its input line.

The inputs to the input lines 11, 12, 13 and 14 of matrix 10 are provided by a counting chain 27 formed of a series of bistable multivibrators 28, 29, 31 and 32 with bistable multivibrator 28 being fed from a standard frequency source 33, such as a 400 cycle tuning fork oscillator. The output circuits 34, 35, 36 and 37 of the bistable multivibrators 28, 29, 31 and 32 are respectively connected to the input lines 11, 12, 13 and 14 of the diode matrix 10 by transistor-emitter-follower circuits 38, 39, 41 and 42, as is well known in the art. The specific circuitry of the bistable multivibrator pulse counting chain 27 does not form a part of my present invention, however, a bistable multivibrator pulse counting chain suitable for use in my invention is illustrated and described in my co-pending application Serial Number 834,733, filed August 19, 1958, now Patent 2,985,828, May 23, 1961, and assigned to the assignee of the present application, my present invention having particular utility for use with the system described therein.

Figure 2:
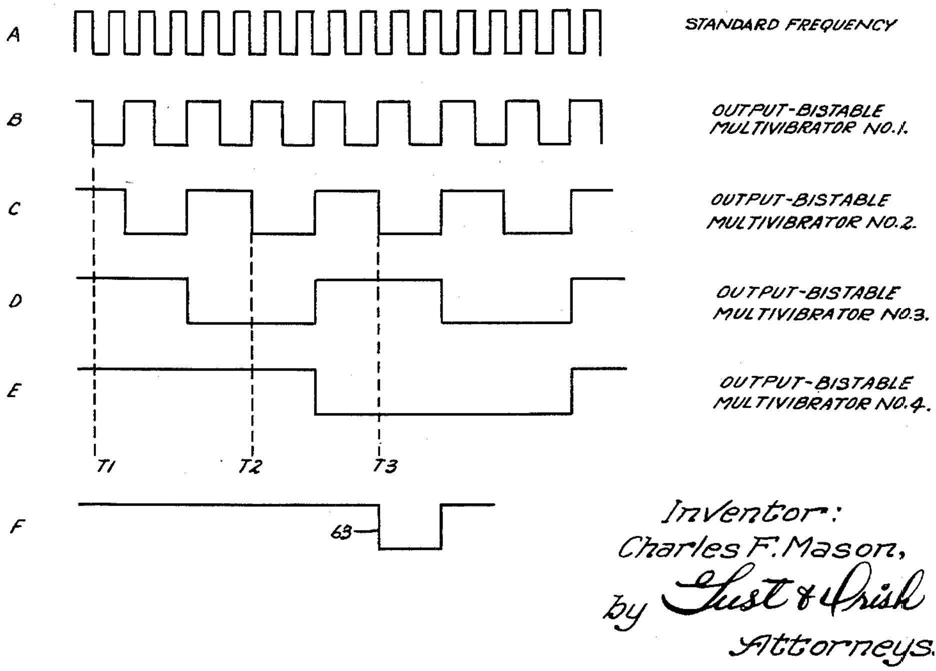
FIG. 2 is a diagram illustrating the output signals from the multivibrator chain of the system of FIG. 1 useful in explaining my invention.

It will be readily apparent that in the partiular arrangement of the diode matrix 10 shown in FIG. 1, it is necessary for all of the bistable multivibrators having diodes connected to the particular output line to be in the negative state in order to obtain an output signal from that line; if one or more of the diodes connected to a particular output line is conducting, no output is obtained from that particular line. Referring now additionally briefly to FIG. 2, the output of the standard frequency source 33 (suitably shaped, as is well known in the art) is shown in FIG. 2A with the outputs of the multivibrators 28, 29, 31 and 32 being shown in FIGS. 2B, C, D and E respectively. It will now be seen that if output circuit 17 of matrix 10 is selected, an output signal will be provided in output circuit 26 the first time that the output signal of bistable multivibrator 28 goes negative, i.e., at time T–1 in FIG. 2. Likewise, by virtue of diodes 21 and 23 respectively interconnecting input lines 12 and 14 with output line 16, if the output line 16 is selected, an output signal will be provided in output circuit 25 the first time that the outputs of both bistable multivibrators 29 and 32 are negative, i.e., at time T–3 as shown in FIG. 2. Likewise, if output line 15 is selected, with diodes 19 and 22 interconnecting input lines 12 and 13 with output line 15, an output signal will be provided in output circuit 24 the first time that the outputs of multivibrators 29 and 31 are negative, i.e., at time T–2 in FIG. 2. It will be readily seen that other time delays may be provided by appropriate connection of the diodes between preselected input and output lines.

In order to provide for selection of the desired matrix output line 15, 16, or 17, a plurality of line selector circuits 43, 44 and 45 are provided each in the form of a transistor amplifier comprising a transistor 46 having its collector 47 connected to a suitable source 48 of positive potential, such as 28 volts, by a load resistor 49 and having its emitter 51 grounded, as shown. The base 52 of each of the transistors of the selector circuits 43, 44 and 45 is connected to a suitable source 53 of base bias potential, such as −28 volts, by resistor 54 thus normally maintaining the transistor 46 in a cut-off condition in the absence of a strongly positive-going input signal impressed on base 52. Base 52 of each of the transistors 46 of the selector circuit 43, 44 and 45 is also connected to a selector switch 55 by a resistor 56, switch 55 being in turn connected to an input terminal 57 to which a suitable positive input potential, such as +28 volts is connected. Collectors 47 of transistors 46 of the selector circuit 43, 44 and 45 are respectively connected to the output lines 15, 16 and 17 of matrix 10 by diodes 58, 59 and 61.

It will now be seen that the output of each of the line selector transistor amplifiers 43, 44 and 45 is connected by a diode 58, 59, 61 to the output line 15, 16, 17 which it is to control, and that each of the amplifiers is biased so that with no input signal applied to its base 52, the transistor is cut-off. Therefore the output of each of the transistor amplifiers is normally in a positive state, i.e., when the transistor is cut-off, its collector 47 is essentially at the same potential as that of terminal 48. It will be observed that diodes 58, 59 and 61 are polarized to conduct when the collectors 47 are positive and thus, since diodes 58, 59 and 61 are respectively connected to the output lines 15, 16 and 17 in the same manner as diodes 18, 19 and 21 through 23, no output can be obtained from any one of the lines when its respective amplifier 43, 44 or 45 is cut-off. It will, however, be seen that when a high positive input signal is applied to the base 52 of any one of the transistors 46 of the amplifiers 43, 44 or 45, the respective transistor conducts heavily, and by virtue of the current flow in its load resistor 49, the potential of its collector 47 drops to its low state, thus cutting off the respective diode 58, 59 or 61. With the diode 58, 59 or 61 blocked, depending upon the transistor 46 to which an input signal has been applied, an output signal will be provided in the respective output circuit 24, 25 or 26 whenever the remaining diodes connected to the respective output line 15, 16 or 17 are all blocked, i.e., when all of the bistable multivibrators connected to the respective input lines to which diodes are connected are in their negative state. Taking a specific example, and referring to output line 16, when no input signal is applied to the transistor of amplifier 44, diode 59 is conducting and thus current flows between source 48 and ground through the respective resistor 49, diode 59, and load resistor 25, thus providing a substantial voltage drop across resistor 25. Assuming now that a positive-going input signal is applied to the base 52 of transistor 46 of amplifier 44 by selector switch 55, diode 59 will be blocked. However, until the first time that the output of bistable multivibrator 32 goes negative, diode 23 as a minimum will still be conducting and thus the same substantial potential drop will appear across load resistor 25. With particular reference to FIG. 2, it will be observed that at the time bistable multivibrator 32 has its output go negative, the output of bistable multivibrator 29 has gone positive, and thus, at this point, while diode 23 is blocked, diode 21 is conducting and thus the same voltage drop will still appear across resistor 25. However, it will be observed that the time T–3 when the output of bistable multivibrator 29 goes negative, diode 21 will also be blocked, and thus with each of the diodes 59, 21 and 23 connected to output line 16 blocked, the current flow in resistor 25 will suddenly be terminated thus suddenly lowering the potential of point 62 essentially to ground, thus providing the drop in potential shown at 63 in FIG. 2F, i.e., a negative going output signal at time T–3.

The output of each of the output lines 15, 16 and 17 of matrix 10 is fed to an emitter-follower circuit 64, 65 and 66, respectively, in order to avoid loading of the output lines 15, 16 and 17. Each of the emitter-follower circuits 64, 65 and 66 comprises a transistor 67 having its collector 68 connected to a suitable source of positive potential 69, such as 28 volts, with its emitter 71 being connected to ground by emitter resistor 72. The base 73 of the transistors 67 of the emitter-follower circuits 64, 65 and 66 are connected to the respective output resistor 24, 25 or 26 of the output lines 15, 16 and 17 of matrix 10 by resistors 74.

The outputs of all of the emitter-follower circuits 64, 65 and 66 are then fed to a diode OR circuit 75 and then through another emitter-follower circuit 76 to the common output line 77. The diode OR circuit 75 comprises diodes 78, 79 and 81 connected respectively to the emitters 71 of the transistor 67 of emitter-follower circuit 64, 65, 66 and to base 82 of transistor 76 by resistor 83. The midpoint between resistor 83 and the diodes 78, 79, 81 is connected to the positive source of potential 69 by a resistor 84. Emitter-follower 76 takes the same form as emitter-followers 64, 65 and 66.

It will now be readily seen that emitter-followers 64, 65 and 66 are normally on, i.e., transistors 67 are normally conducting, when the output signals across load resistors 24, 25 and 26 of output lines 15, 16 and 17 of matrix 10 are in the positive state, and thus it will further be seen that under these conditions, the diodes 78, 79, 81 are polarized so as to be blocked. Assuming now again that output line 16 of matrix 10 has been selected by selector switch 55 and that time delay T-3 has passed so that diodes 21 and 23 are both blocked responsive to the negative outputs of bistable multivibrators 29 and 32 so that the potential at point 62 has dropped essentially to ground, it will be readily comprehended that transistor 67 of emitter-follower circuit 65 will be essentially cut-off so that the potential of its emitter 71 likewise essentially falls to ground, thus causing diode 79 to conduct. With diode 79 conducting, the potential drop across resistor 84 sufficiently lowers the potential applied to the base 82 of emitter-follower transistor 76 to cut it off so that an output signal is provided on the common output lines 77, as shown at 85.

It will now be seen that at any time any one of the output lines 15, 16 and 17 has an output, i.e., a negative-going output signal, that signal will appear at the common output terminal 77 and that since the selector amplifiers 43, 44 and 45 are all normally biased off, no output signal will be obtained unless the positive-going input voltage is impressed on one of the selector amplifiers; with one of the output lines 15, 16 and 17 selected by applying a positive voltage on one of the selector amplifiers 43, 44 or 45 by selector switch 55, an output signal will be obtained at the common output terminal 77 at a time which depends upon which matrix output line was selected. It is thus seen that my improved circuit performs the same function as the relay circuitry previously employed, but is inherently faster and more reliable by virtue of the employment of transistors and elimination of relays. It will further be seen that my circuit requires extremely low power for operation compared with that required for relay operation and that the selector amplifiers 43, 44 and 45 present relatively high input impedance compared with the input impedance presented by relay operating coils, particularly if emitter-follower inputs are employed. It will further be seen that my system is less expensive than the prior relay circuitry since good transistors are less expensive than good relays, and further that since static components are involved in my system, the system inherently is long-lived since there are no moving parts to wear out, as in the case of relays.

While the application of the required positive voltage for energization of the selector amplifiers 43, 44 or 45 is shown as being provided by a selector switch 55 which applies the proper positive voltage to the desired amplifier, it will be readily understood that the input circuits of the transistors 46 of amplifiers 43, 44 and 45 can be driven by a solid-state programming device. It will be readily understood that all of the diodes shown in FIG. 1 may be reversed so that the matrix adds positive-going pulses rather than negative-going pulses.

While I have described above the principles of my invention in connection with specific apparatus, it is to be clearly understood that this description is made only by way of example and not as a limitation to the scope of my invention.

What is claimed is:

1. In combination: a matrix comprising a plurality of input lines connected respectively to first potential sources, each of said first sources having upper and lower potential states, a plurality of output lines respectively connected to first output circuits, and a plurality of first static switching devices respectively interconnecting predetermined ones of said input and output lines, each of said first devices being biased to connect its respective input and output lines when the potential source of its input line is in one of its potential states and to disconnect said lines when the potential source is in its opposite potential state; a plurality of output line selector circuits for respectively providing one potential state responsive to an input signal and another potential state in the absence of an input signal, said selector circuits being respectively connected to said output lines by second static switching devices, each of said second devices being biased to connect its respective output line to another source of potential when its selector circuit provides one of its potential states and to disconnect the same when its selector circuit provides the other of its potential states whereby current flows in a first output circuit when any switching device has connected its respective potential source to the respective output line; means for selecting one of said output lines comprising means for selectively impressing an input signal on one of said selector circuits so that the respective second device disconnects its source from the one output line whereby the output circuit of said one output line has no current flowing therein when all of the first potential sources which are connected to said one output line by respective first devices are in said opposite potential state; and a circuit coupled to said first output circuits for providing an output signal responsive to the absence of current flow in any one of said first output circuits.

2. In combination: a matrix comprising a plurality of input lines connected respectively to first potential sources, each of said first sources having upper and lower potential states, a plurality of output lines respectively connected to first output circuits, and a plurality of first diodes respectively interconnecting predetermined ones of said input and output lines, each of said first diodes being biased to connect its respective input and output lines when the potential source of its input line is in one of its potential states and to disconnect said lines when the potential source is in its opposite potential state; a plurality of output line selector circuits for respectively providing one potential state responsive to an input signal and another potential state in the absence of an input signal, said selector circuits being respectively connected to said output lines by second diodes, each of said second diodes being biased to connect its respective output line to another source of potential when its selector circuit provides one of its potential states and to disconnect the same when its selector circuit provides the other of its potential states whereby current flows in a first output circuit when any diode means has connected its respective potential source to the respective output line; means for selecting one of said output lines comprising means for selectively impressing an input signal on one of said selector circuits so that the respective second diode disconnects its source from the one output line whereby the output circuit of said one output line has no current flowing therein when all of the first potential sources which are connected to said one output line by respective first diodes are in said opposite potential state; and a circuit coupled to said first output circuits for providing the absence of current flow in output signal responsive to any one of said first output circuits.

3. In combination: a diode matrix comprising a plurality of input lines connected respectively to first potential sources, each of said first sources having upper and lower potential states, a plurality of output lines respectively connected to first output circuits, and a plurality of first diodes respectively interconnecting predetermined ones of said input and output lines, each of said first diodes being biased to conduct when the potential source of its input line is in its upper potential state and to be blocked when the source is in its lower potential state; a plurality of output line selector circuits for respectively providing an upper potential state in the absence of an input signal and a lower potential state responsive to an input signal, said selector circuits being respectively connected to said output lines by second diodes, each of said second diodes being biased to conduct when its selector circuit provides its upper potential state and to be blocked when the same provides its lower potential state whereby current flows in a first output circuit when any diode connected to the respective output line is conducting; means for selecting one of said matrix output lines comprising means for selectively impressing an input signal on one of said selector circuits so that the respective second diode is blocked whereby the output circuit of said one output line has no current flowing therein when all of the first potential sources which are connected to said one output line by respective first diodes are in their lower potential state; and a circuit coupled to said first output circuits for providing an output signal responsive to the absence of current flow in any one of said first output circuits.

4. In combination: a diode matrix comprising a plurality of input lines connected respectively to first potential sources, each of said first sources having upper and lower potential states, a plurality of output lines respectively connected to first output circuits, and a plurality of first diodes respectively interconnecting predetermined ones of said input and output lines, each of said first diodes being biased to conduct when the potential source of its input line is in its upper potential state and to be blocked when the source is in its lower potential state; a plurality of output line selector circuits for respectively providing an upper potential state in the absence of an input signal and a lower potential state responsive to an input signal, said selector circuits being respectively connected to said matrix output lines by second diodes, each of said second diodes being polarized to conduct when its selector circuit provides its upper potential state and to be blocked when the same provides its lower potential state whereby current flows in a first output circuit when any diode connected to the respective output line is conducting; means for selecting one of said output lines comprising means for selectively impressing an input signal on one of said selector circuits so that the respective second diode is blocked whereby the output circuit of said one output line has no current flowing therein when all of the first potential sources which are connected to said one output line by respective first diodes are in their lower potential state; and a diode OR circuit coupled to said first output circuits for providing the absence of current flow in response to an output signal in any one of said first output circuits.

5. In combination: a diode matrix comprising a plurality of input lines connected respectively to first potential sources, each of said first sources having upper and lower potential states, a plurality of output lines respectively connected to first output circuits, and a plurality of first diodes respectively interconnecting predetermined ones of said input and output lines, each of said first diodes being biased to conduct when the potential source of its input line is in its upper potential state and to be blocked when the source is in its lower potential state; a plurality of output line selector circuits each including a valve device having control and output elements, each of said selector circuits having a second output circuit coupled to its valve device output element for providing a lower potential state responsive to impression of an input signal on its valve device control element and an upper potential state in the absence of an input signal, said second output circuits being respectively connected to said matrix output lines by second diodes, each of said second diodes being biased to conduct when its respective second output circuit provides its upper potential state and to be blocked when the same provides its lower potential state whereby current flows in the first output circuit when any diode connected to the respective output line is conducting; means for selecting one of said output lines comprising switching means for selectively impressing an input signal on the valve device control element of one of said selector circuits so that the respective second diode is blocked whereby the output circuit of said one output line has no current flowing therein when all of the first potential sources which are connected to said one output line by respective first diodes are in their lower potential state; and a circuit coupled to said first output circuits for providing an output signal responsive to the absence of current flow in any one of said first output circuits.

6. The combination of claim 5 in which said valve devices are transistors each having emitter, collector and base elements with said control element being the base and said load element being one of the emitter and collector elements.

7. In combination: a diode matrix comprising a plurality of input lines connected respectively to first potential sources, each of said first sources having upper and lower potential states, a plurality of output lines respectively connected to first output circuits, and a plurality of first diodes respectively interconnecting predetermined ones of said input and output lines, each of said first diodes being biased to conduct when the potential source of its input line is in its upper potential state and to be blocked when the source is in its lower potential state; a plurality of selector circuits each including a transistor having emitter, collector and base elements, each of said selector circuits having a second output circuit coupled to one of the collector and emitter elements of its transistor for providing a lower potential state responsive to impression of an input signal on the base of its transistor and an upper potential state in the absence of an input signal, said second output circuits being respectively connected to said output lines by second diodes, each of said second diodes being biased to conduct when its respective second output circuit provides its upper potential state and to be blocked when the same provides its lower potential state when current flows in a first output circuit when any diode connected to the respective output line is conducting; means for selecting one of said output lines comprising switching means for selectively impressing an input signal on the base of the transistor of one of said selector circuits so that the respective second diode is blocked whereby the output circuit of said one output line has no current flowing therein when all of the potential sources which are connected to said one output line by respective first diodes are in their lower potential state; and a diode OR circuit coupled to said first output circuits for providing an output signal responsive to the absence of current flow in any one of said first output circuits.

8. In combination: a diode matrix comprising a plurality of input lines connected respectively to first potential sources, each of said first sources having upper and lower potential states, a plurality of output lines respectively connected to first output circuits, and a plurality of first diodes respectively interconnecting predetermined ones of said input and output lines, each of said first diodes being biased to conduct when the potential source of its input line is in its upper potential state and to be blocked when the source is in its lower potential state; a plurality of amplifier circuits each including a transistor having emitter, collector and base elements, each of said amplifier circuits having a second output circuit coupled to the collector element of its transistor for providing a lower potential state responsive to impression of a positive-going input signal on the base of its transistor and an upper potential state in the absence of an input signal, said second output circuits being respectively connected to said output lines by second diodes, each of said second diodes being biased to conduct when its respective second output circuit provides its upper potential state and to be blocked when the same provides its lower potential state; means for selecting one of said output lines comprising switching means for selectively impressing a positive-going input signal on the base of the transistor of one of said amplifier circuits so that the respective second diode is blocked, each of said first output circuit having a current flow therein when any diode connected to its output line is conducting and no current flow therein when no diode connected to its output line is conducting; a plurality of emitter-follower circuits each comprising emitter, collector and base elements with a third output circuit coupled to its emitter, said emitter-follower circuits having the bases of their transistor respectively coupled to said first output circuits; and a diode OR circuit comprising a plurality of third diodes coupled to said third output circuits for providing an output signal responsive to the absence of current flow in any one of said third output circuits.

9. In combination: a diode matrix comprising a plurality of input lines connected respectively to first potential sources, each of said first sources having positive and negative potential states, a plurality of output lines respectively connected to ground by a first load resistor, and a plurality of first diodes respectively interconnecting predetermined ones of said input and output lines, each of said first diodes being biased to conduct when the potential source of its respective input line is in its positive potential state and to be blocked when its respective potential source is in its negative potential state; a plurality of transistor amplifiers each comprising a transistor having emitter, collector and base elements with the emitter grounded and the collector connected to an output circuit and to a source of positive potential by a second load resistor, each of said amplifier transistors having its base element coupled to an input circuit and to a circuit for biasing the base element so that the amplifier is normally cut-off in the absence of an input signal whereby the output of said amplifier is normally in the positive state, each of said amplifiers having its output circuit connected to a respective output line by a second diode biased to conduct when the respective amplifier is in its positive state; said first load resistors each having a current flow therein when any diode connected to the respective output line is conducting; means for selecting one of said output lines comprising switching means for selectively impressing an input signal on one of said amplifier input circuits thereby causing the respective amplifier to conduct and its output to drop to its low state whereby the second diode connected thereto is blocked so that said first load resistor of the respective output line has no current flow therein when all of the first potential sources connected to the respective output line by respective first diodes are in their negative state; a plurality of first transistor emitter-follower circuits each comprising a transistor having emitter, collector and base elements with the emitter connected to an output circuit and to ground by a third load resistor and the collector connected to a source of positive potential, each of said emitter-follower circuits having the base of its transistor connected to a respective output line by a resistor whereby the circuit conducts providing a positive state output responsive to current flow in the respective first load resistor and the circuit is cut-off whereby its output drops to its low state responsive to the absence of current flow in the respective first load resistor; another transistor emitter-follower circuit comprising a transistor having emitter, collector and base elements with the emitter connected to an output circuit and to ground by a fourth load resistor and the collector connected to a source of positive potential, said other emitter-follower circuit having an input circuit including a resistor connected to its base; and a diode OR circuit comprising a plurality of diodes connected respectively to said other emitter-follower input circuit and to the output circuits of said first emitter-follower circuits, said other emitter-follower input circuit also being connected to a source of positive potential by a resistor and said OR circuit diodes being biased to conduct when the output of the respective first emitter-follower is in its low state and to be blocked when the same is in its positive state whereby the output of said other emitter-follower circuit is caused to drop from its positive to its low state responsive to selection by said selecting means of one of said output lines and all of the first potential sources connected to the input lines interconnected therewith being in their negative states.

References Cited in the file of this patent

UNITED STATES PATENTS

| | | |
|---|---|---|
| 2,136,441 | Karolus | Mar. 15, 1938 |
| 2,535,303 | Lewis | Dec. 26, 1950 |
| 2,686,299 | Eckert | Aug. 10, 1954 |

OTHER REFERENCES

Proceedings of the I.R.E., February 1949, Rectifier Networks for Multiposition Switching, By Brown and Rochester, pp. 139–147.

Proceedings of Institute of Electrical Engineers, Mar. 1955, pp. 158, 159, by Steele.

UNITED STATES PATENT OFFICE

CERTIFICATE OF CORRECTION

Patent No. 3,054,985 September 18, 1962

Charles F. Mason

It is hereby certified that error appears in the above numbered patent requiring correction and that the said Letters Patent should read as corrected below.

Column 6, lines 59 to 61, for "the absence of current flow in output signal responsive to any one of said first output circuits." read -- an output signal responsive to the absence of current flow in any one of said first output circuits. --; column 7, lines 33 and 34, for "polarized" read -- biased --; same column 7, lines 47 and 48, for "the absence of current flow in response to an output signal in any one of said first output circuits." read -- an output signal responsive to the absence of current flow in any one of said first output circuits. --.

Signed and sealed this 29th day of January 1963.

(SEAL)

Attest:

ERNEST W. SWIDER

Attesting Officer

DAVID L. LADD

Commissioner of Patents